(12) United States Patent
Vinson et al.

(10) Patent No.: US 8,595,432 B1
(45) Date of Patent: Nov. 26, 2013

(54) SCHEDULING COMMANDS IN A DEPENDENT ARRAY OF DISK DRIVES

(75) Inventors: Wayne H. Vinson, Longmont, CO (US); Edwin S. Olds, Fort Collins, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 105 days.

(21) Appl. No.: 13/237,683

(22) Filed: Sep. 20, 2011

(51) Int. Cl.
*G06F 12/00* (2006.01)
(52) U.S. Cl.
USPC ............... 711/112; 711/E12.002; 710/240
(58) Field of Classification Search
USPC ............... 711/112, E12.002; 710/240
See application file for complete search history.

(56) References Cited

U.S. PATENT DOCUMENTS

| | | | |
|---|---|---|---|
| 5,664,143 A * | 9/1997 | Olbrich | 711/112 |
| 6,691,198 B1 | 2/2004 | Hamlin | |
| 6,928,470 B1 | 8/2005 | Hamlin | |
| 6,928,515 B2 | 8/2005 | Hassner et al. | |
| 2012/0066448 A1 * | 3/2012 | Colgrove et al. | 711/114 |

* cited by examiner

*Primary Examiner* — Edward Dudek, Jr.

(57) ABSTRACT

A disk drive is disclosed comprising a head actuated over a disk. The disk drive receives a plurality of access commands including a first access command out of a group G of access commands. The access commands are stored in a command queue. A completion status is received for a number of access commands out of the G access commands that are assigned to other disk drives, and the first access command is selected from the command queue based on the completion status.

21 Claims, 6 Drawing Sheets

1

SCHEDULING COMMANDS IN A DEPENDENT ARRAY OF DISK DRIVES

BACKGROUND

An array of disk drives referred to as a Redundant Array of Independent Disks (RAID) is typically employed in enterprise systems to store large amounts of data to achieve redundancy and/or improved performance through command striping. With command striping, a large host command is divided into a number of smaller access commands by an array controller, and the smaller access commands transmitted to a number of the disk drives in the array for concurrent processing. The array controller will typically not report a command completion to the host until each of the individual drives have completed their assigned access commands corresponding to a host command.

Each disk drive in an arrayed storage system may implement command queuing wherein a number of access commands received from the array controller are queued in a command queue, and then selected for execution in an order that minimizes the access latency of the disk drive in terms of seek latency and rotational latency. This type of command scheduling implemented internal to each disk drive is typically referred to as rotational position optimization (RPO). If a number of access commands are queued in the command queues that correspond to a number of different host commands, there may be a large variance in the command completion time as seen from the host since each disk drive selects the access commands from the command queue independent of the other disk drives. That is, each disk drive executes the RPO scheduling algorithm independent of the other disk drives which can lead to a large variance in completing the access commands of any one host command.

DETAILED DESCRIPTION OF EMBODIMENTS OF THE INVENTION

Figure 1A:
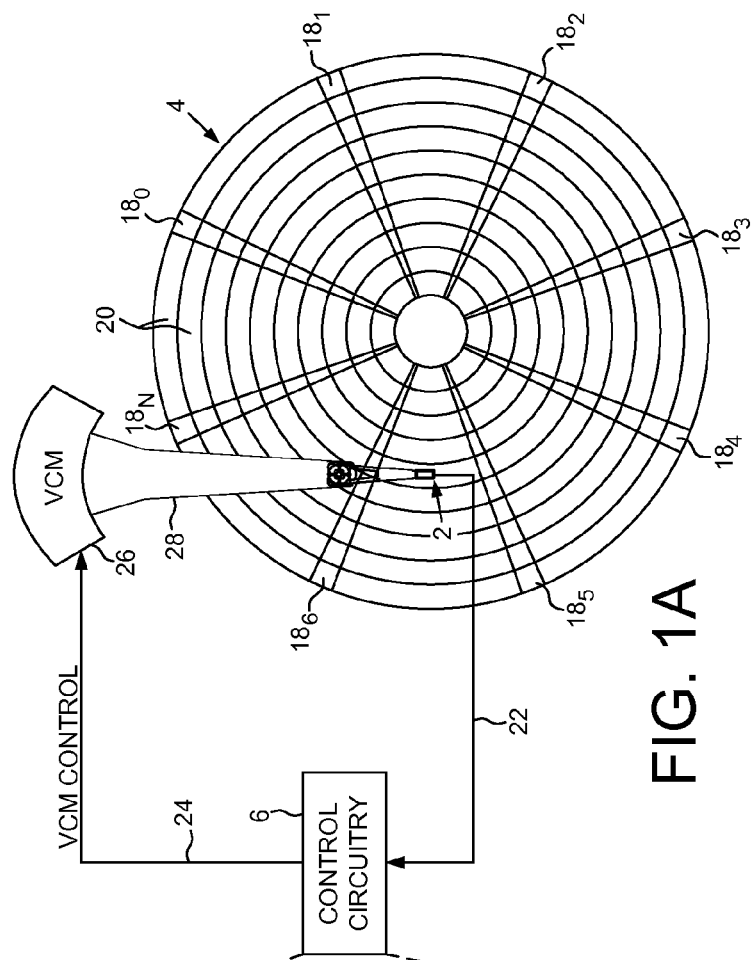
FIG. 1A shows a disk drive according to an embodiment of the present invention comprising a head actuated over a disk.
Figure 1B:
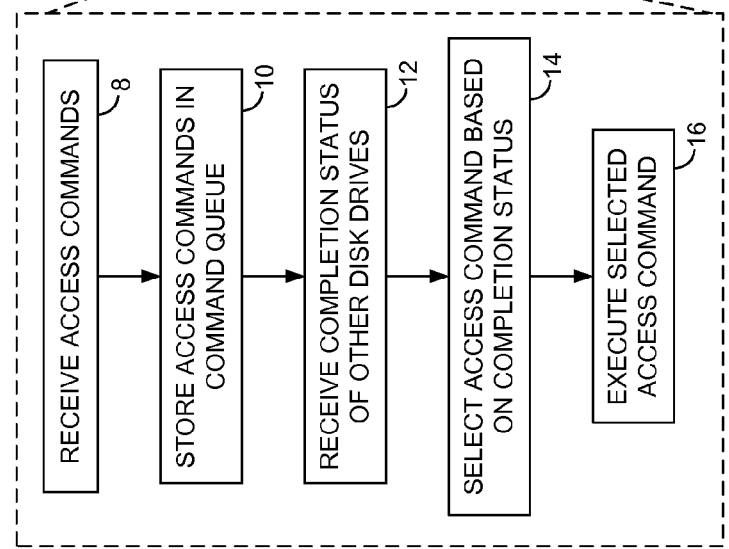
FIG. 1B shows a flow diagram according to an embodiment of the present invention wherein a completion status is received for a plurality of access commands out of a group G of access commands assigned to other disk drives.

FIG. 1A shows a disk drive according to an embodiment of the present invention comprising a head 2 actuated over a disk 4. The disk drive further comprises control circuitry 6 operable to execute the flow diagram of FIG. 1B, wherein a plurality of access commands are received including a first access command out of a group G of access commands (step 8). The access commands are stored in a command queue (step 10). A completion status is received for a number of access commands out of the G access commands that are assigned to other disk drives (step 12), and the first access command is selected from the command queue based on the completion status (step 14). The selected access command is then executed (step 16).

In the embodiment of FIG. 1A, the disk 4 comprises embedded servo sectors $18_0\text{-}18_N$ that define a plurality of tracks 20. The control circuitry 6 processes a read signal 22 emanating from the head 2 to demodulate the servo sectors $18_0\text{-}18_N$ and generate a position error signal (PES) representing an error between the actual position of the head and a target position relative to a target track. The control circuitry 6 filters the PES using a suitable compensation filter to generate a control signal 24 applied to a voice coil motor (VCM) 26 which rotates an actuator arm 28 about a pivot in order to actuate the head 2 radially over the disk in a direction that reduces the PES. The servo sectors $18_0\text{-}18_N$ may comprise any suitable position information, such as a track address for coarse positioning and servo bursts for fine positioning. The servo bursts may comprise any suitable pattern, such as the amplitude-based servo pattern (e.g., a quadrature servo pattern), or a suitable phase-based servo pattern. In an embodiment described below, the control circuitry estimates a seek latency of the head 2 and a rotational latency of the disk 4 associated with executing each access command stored in the command queue, wherein the seek and rotational latency are estimated relative to the servo sectors $18_0\text{-}18_N$.

Figure 2:
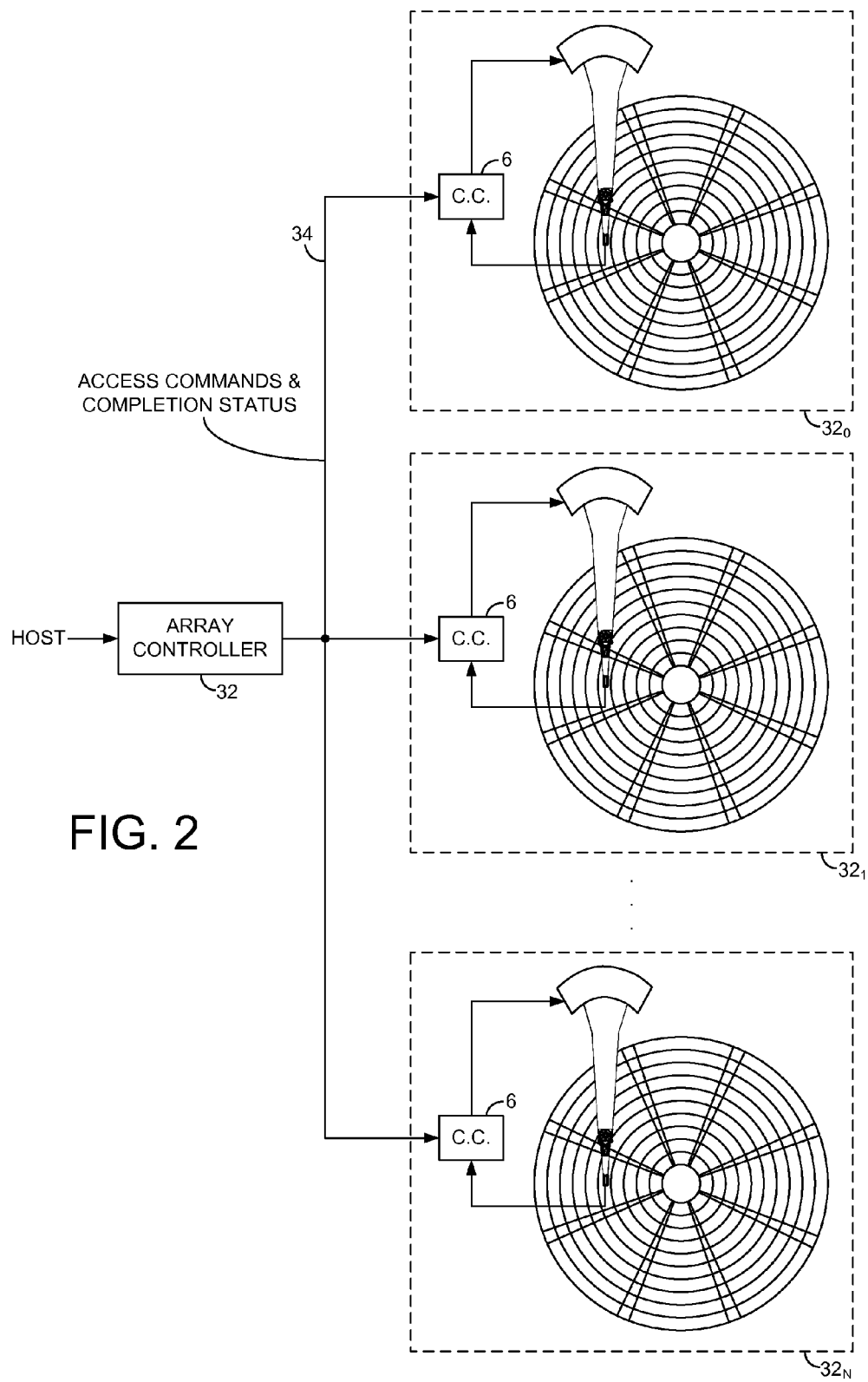
FIG. 2 shows an embodiment of the present invention wherein an array controller transmits the access commands and the completion status to an array of disk drives.

FIG. 2 shows a dependent array of disk drives $30_0\text{-}30_N$ and an array controller 32 according to an embodiment of the present invention wherein the array controller 32 transmits access commands and receives/transmits a completion status over an interface 34 to each of the disk drives $30_0\text{-}30_N$ in the array. The interface 34 may comprise any suitable communication channel, such as a wired channel (bus), an optical channel, or a wireless channel. The access commands and completion status may be transmitted using any suitable protocol, such as parallel or serial ATA, USB, SCSI, serial attached SCSI, Fibre Channel, etc. In one embodiment, one of the aforementioned conventional protocols may be modified to support the transmission of the completion status for each disk drive to the other disk drives in the array.

Figure 3:
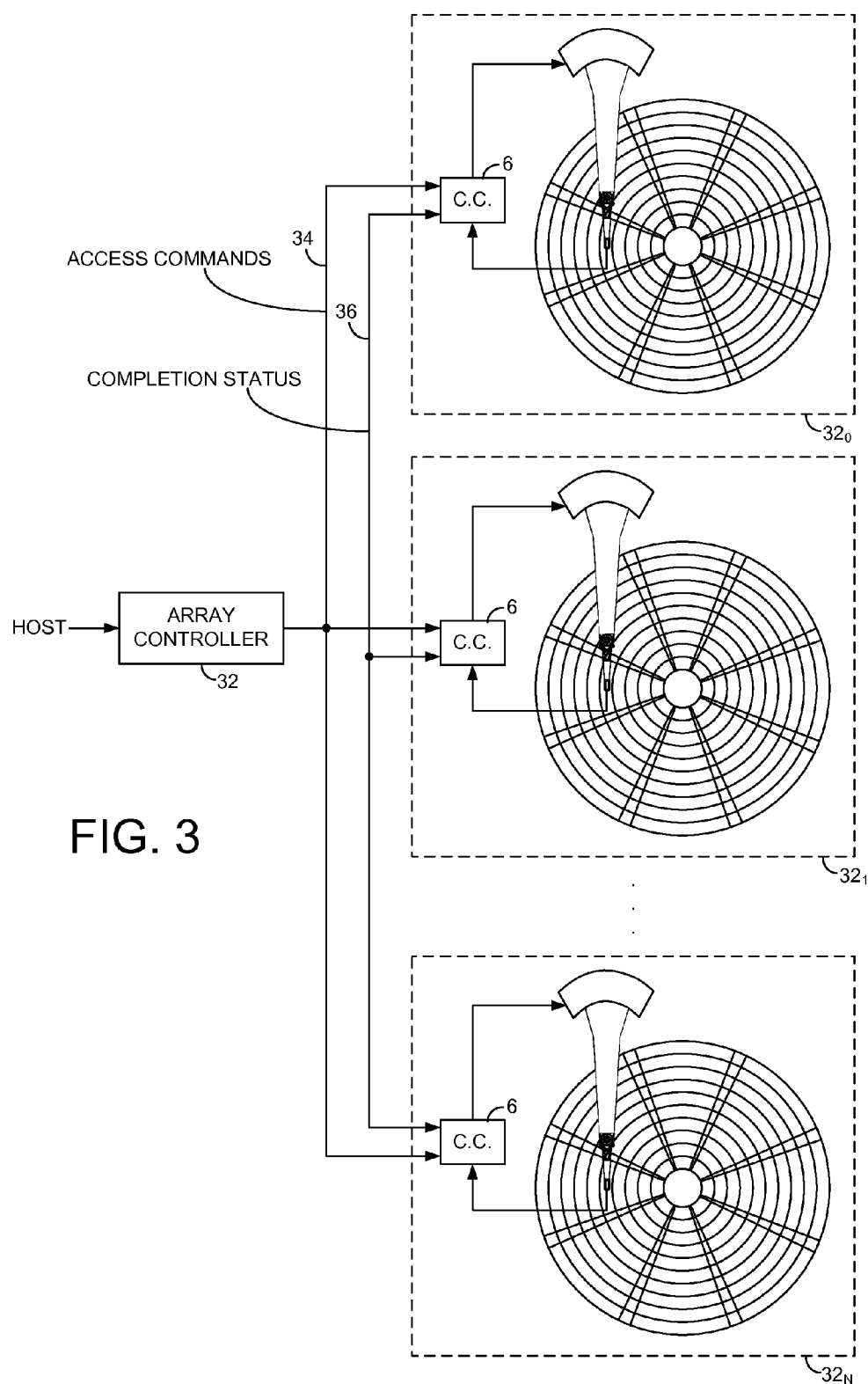
FIG. 3 shows an embodiment of the present invention wherein an array controller transmits the access commands to the array of disk drives, and each disk drive transmits its completion status to the other disk drives in the array.

In an alternative embodiment illustrated in FIG. 3, the array controller 32 may transmit the access commands to the disk drives over a first interface 34, whereas the completion status may be transmitted between the disk drives in the array over a second interface 36. Similar to the first interface 34, the second interface 36 may comprise any suitable communication channel, such as a wired channel (bus), an optical channel, or a wireless channel. In one embodiment, the first interface 34 may comprise a wired channel (bus) and the second interface 36 may comprise a wireless channel (e.g., Bluetooth, Wi-Fi, etc.). In this embodiment, a conventional RAID configuration of disk drives may be employed utilizing a conventional wired bus (parallel or serial) for communicating the access commands and command data without needing to add additional wiring to support the completion status which is transmitted over a wireless channel.

In the embodiments of FIG. 2 and FIG. 3, the array controller 32 may receive a host command in order to write data to the storage device. The write command may comprise a significant amount of data such that performance is improved if the write command is broken into a group G of write commands which are then distributed to the array of disk drives for concurrent processing (striping). Alternatively (or in addition), a write command may be mirrored on at least two of the drives to provide redundancy. When processing a corresponding read command, performance is improved due to the striping and/or mirroring since a group G of read commands can be distributed to the array of disk drives for concurrent processing.

In the embodiments of the present invention, each disk drive in the array schedules access commands for execution by taking into consideration the grouping and completion status of access commands being processed by other disk drives in the array. For example, if an access command in the command queue of a disk drive belongs to a group G of access commands concurrently being executed by the array, the control circuitry takes into account the completion status of the access commands being processed by the other disk drives when determining a scheduling priority. If the other disk drives have completed or are near completing the access commands in a group G of access commands, the control circuitry increases the priority of the access command(s) in its command queue that belong to the group G. In this manner, the access command(s) in the group G are processed sooner so that the array controller 32 can report a command completion status to the host for the host command that corresponds to the group G.

In one embodiment, the control circuitry may schedule access commands in its command queue based only on the completion status of access commands in various groups. In the event all of the access commands in the command queue have the same priority based on the completion status of the groups, the control circuitry may select the access command corresponding to the largest group G of access commands. In other embodiments, the control circuitry may take into account other factors in addition to the completion status in scheduling the access commands in the command queue. For example in one embodiment, the control circuitry may execute a rotational position optimization (RPO) algorithm in order to prioritize the access commands based on the mechanical latency of the disk drive (the seek latency of the head and the rotational latency of the disk). The access time generated by the RPO algorithm may then be biased or overridden based on the completion status.

Referring again to FIG. 1A, the seek latency of the head 2 corresponds to the distance the head must move radially over the disk to access a target track corresponding to an access command in the command queue. The rotational latency of the disk corresponds to the angle the disk must rotate before the head reaches the first target data sector of the target track. In one embodiment, the RPO algorithm estimates an access time for an access command by estimating the number of servo sectors that will be crossed when seeking the head to the target track, and the number of servo sectors that will be crossed waiting for the disk to rotate until the head is over the target data sector. In some embodiments, a more sophisticated RPO algorithm may be employed that evaluates other variables in addition to the seek latency of the head and the rotational latency of the disk in order to estimate the access time of an access command.

In one embodiment, the control circuitry estimates an access time for each access command in the command queue using the RPO algorithm, and then biases the results using the completion status for the groups when selecting the next access command to execute. Accordingly, this embodiment attempts to reduce the mechanical access latency of each disk drive while improving overall performance of the array by also evaluating the completion status of a group which reduces the variance in completing the access commands of any one host command.

Figure 4A:
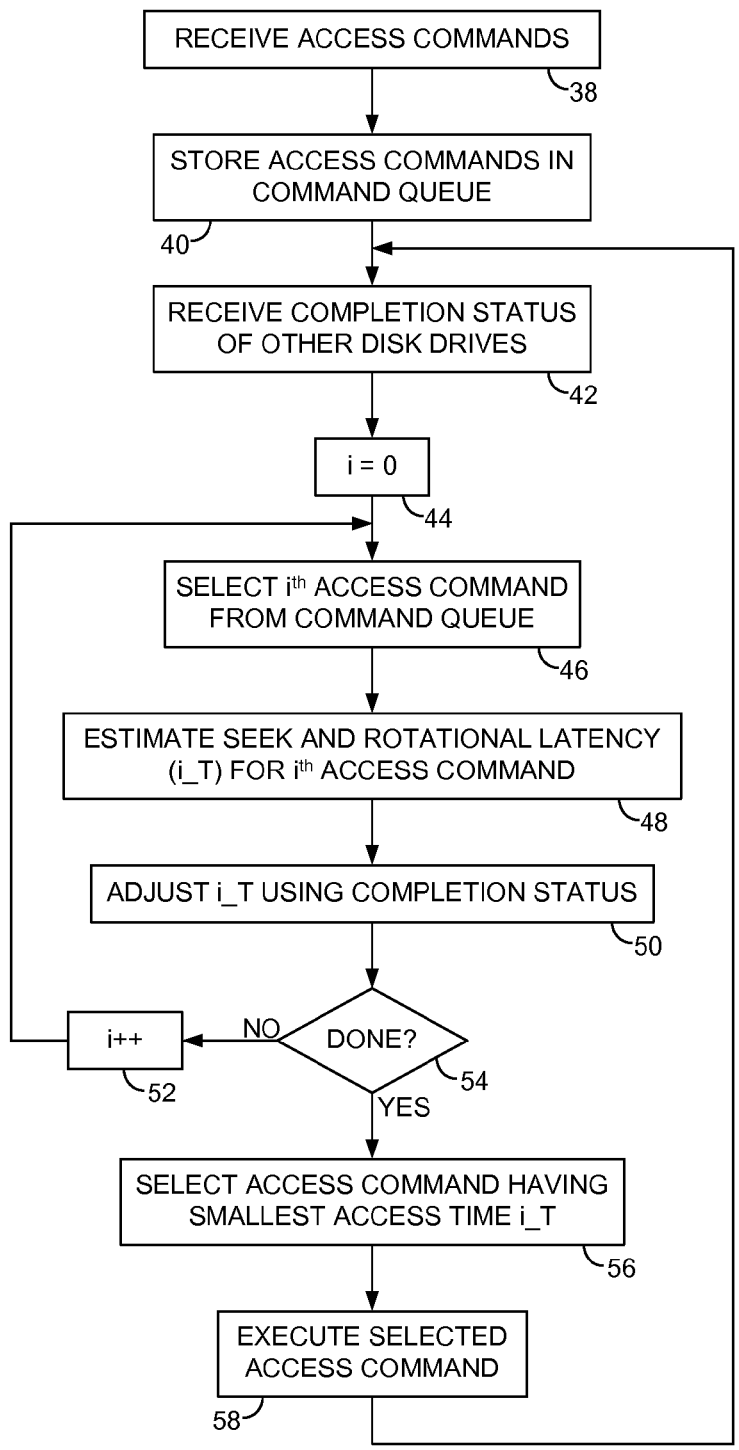
FIG. 4A is a flow diagram according to an embodiment of the present invention wherein each disk drive schedules access commands based on a seek and rotational latency for each command and based on the completion status for the other disk drives.

FIG. 4A is a flow diagram according to this embodiment which is executed by the control circuitry of each individual disk drive. Access commands are received from the array controller (step 38) and stored in a command queue (step 40). A completion status is received for the other disk drives executing access commands in at least one common group (step 42). A command counter is initialized (step 44), and then a loop is executed for each access command in the command queue. The $i^{th}$ access command is selected from the command queue (step 46) and an access time i_T is computed based on an estimated seek and rotational latency (step 48). The access time i_T is then adjusted using the completion status corresponding to the group G of access commands being processed by the array (step 50). The command counter is incremented (step 52) and the loop is repeated for the next access command in the command queue until all of the access commands have been processed (step 54). The access command having the smallest adjusted access time is then selected (step 56) and the selected access command is executed (step 58).

Figure 4B:
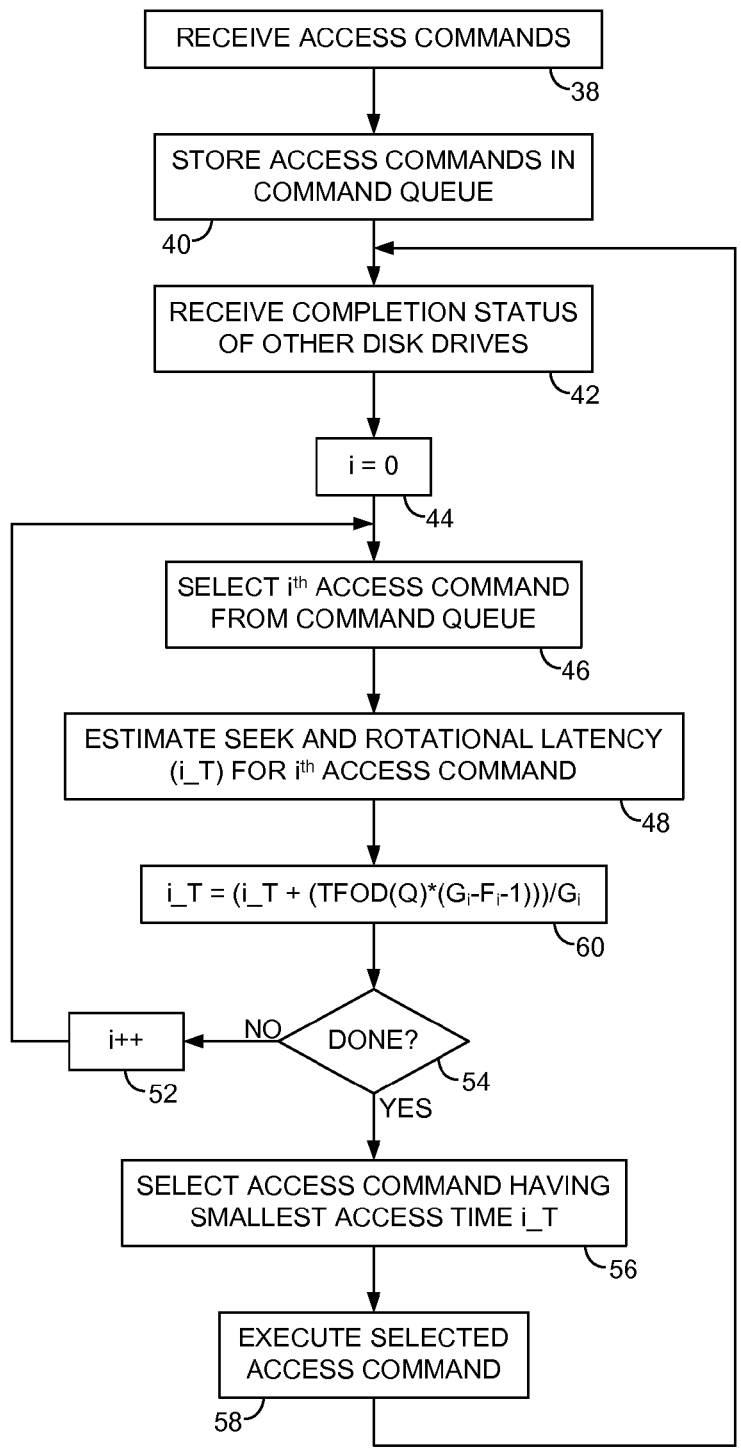
FIG. 4B is a flow diagram according to an embodiment of the present invention showing a particular algorithm for adjusting access times of access commands based on the completion status.
Figure 4C:
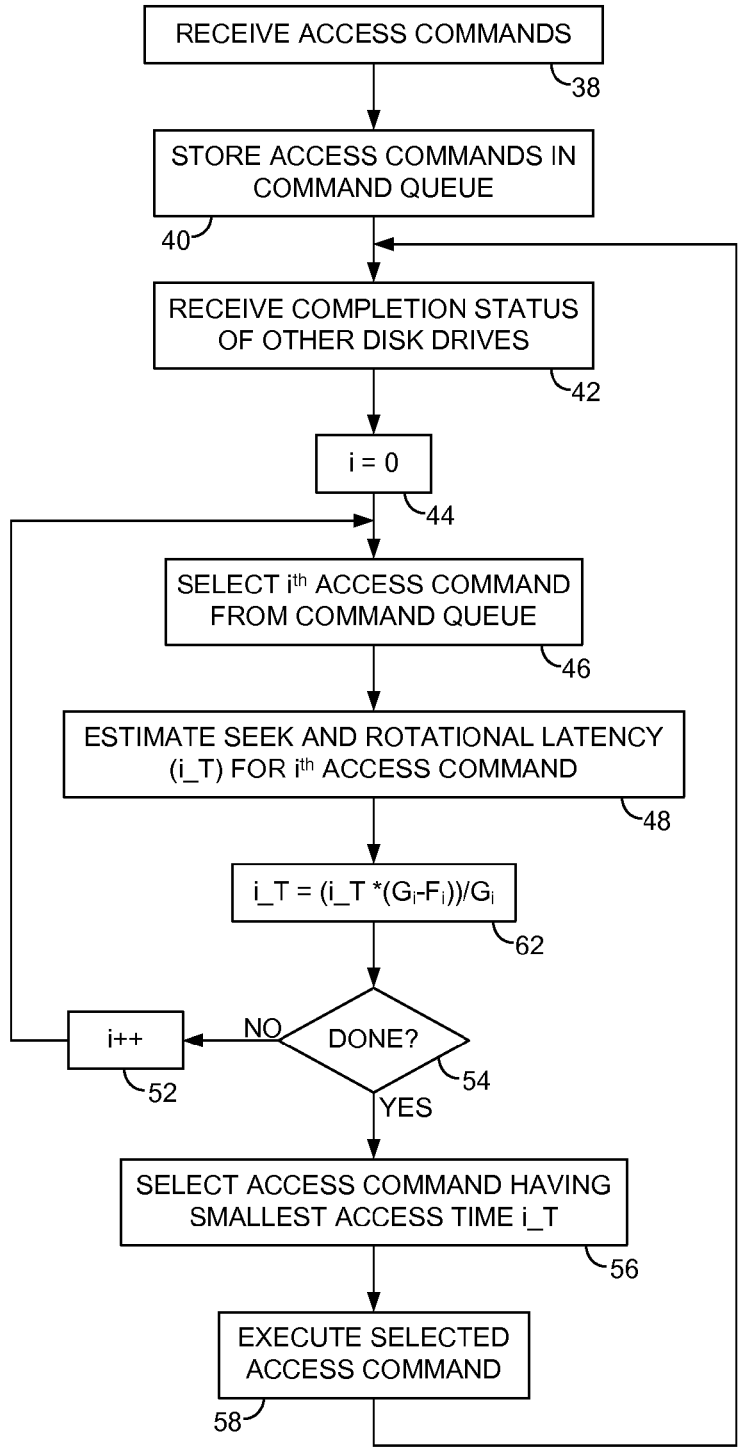
FIG. 4C is a flow diagram according to an embodiment of the present invention showing an alternative algorithm for adjusting access times of access commands based on the completion status.

Any suitable algorithm may be employed in the embodiments of the present invention to adjust the access time i_T at step 50 of FIG. 4A so that the scheduling priority of an access command in a group G increases as the number of access commands in the group G completed by the other disk drives increases. In an embodiment shown in the flow diagram of FIG. 4B, the access time i_T of an access command may be adjusted (step 60) according to:

$$i\_T = (i\_T + (TFOD(Q)*(G-F-1)))/G$$

where TFOD(Q) represents an average time for the other disk drives to complete a single access command at a command queue depth of Q, and F represents a number of the access commands out of the G access commands completed by the other disk drives. In an alternative embodiment, instead of estimating the average time for the other disk drives to complete an access command TFOD(Q) as in the above equation, the actual access time for each access command in each disk drive may be included in the completion status. In yet another embodiment shown in the flow diagram of FIG. 4C, the above equation may be simplified by replacing TFOD(Q) with i_T such that the access time is adjusted (step 62) according to:

$$i\_T = (i\_T*(G-F))/G.$$

Any suitable completion status may be transmitted to the disk drives in the array, wherein in the above equations, the completion status identifies the access commands F in a group G that have been completed by the other disk drives. In an alternative embodiment, the completion status may identify the access commands in a group G that are pending in the other disk drives, wherein the above equations are modified accordingly.

In one embodiment, the status for each group may be determined by the array controller 32 as each disk drive reports to the array controller 32 that an access command has been completed. In this embodiment, the completion status transmitted to the disk drives may identify each group and the completion status of each group (e.g., in the embodiment of FIG. 2). In the embodiment of FIG. 3, the status for each group may be determined by each individual disk drive. For example, the completion status may identify a group being processed by a particular disk drive, and the corresponding completion status of each access command for the group. After receiving the completion status from all of the other disk drives, an individual disk drive can determine the status of each particular group in order to bias the access times of the access commands in its command queue.

In one embodiment, the grouping of access commands may be unknown to the disk drives in the array. For example, the array controller 32 may implement a conventional protocol that does not include grouping information for the access commands. In this embodiment, the completion status broadcast by each disk drive to the other disk drives in the array may include the logical block address (LBA) range for a completed (or pending) access command. Each disk drive may then infer the grouping of the access commands based on the proximity of the LBA ranges.

Another embodiment of the present invention may be considered as a method of scheduling commands in a dependent array of disk drives. The method comprises transmitting a first access command out of a group G of access commands to a first disk drive, transmitting a plurality of the access commands out of the group G of access commands to other disk drives, and transmitting a completion status to the first disk drive, wherein the completion status corresponds to a status of the plurality of access commands transmitted to the other disk drives. The method may be executed by suitable control circuitry within the array controller 32 as described above with reference to FIG. 2, or by the control circuitry of the disk drives in an array that broadcasts the completion status as described above with reference to FIG. 3.

Any suitable control circuitry may be employed to implement the embodiments of the present invention, such as any suitable integrated circuit or circuits. For example, the control circuitry within each disk drive of the array may include a disk controller and a read channel. In one embodiment, the disk controller and read channel are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry within the array controller and within each disk drive comprises a microprocessor executing instructions, the instructions being operable to cause the microprocessor to perform the steps of the embodiments described herein. The instructions may be stored in any computer-readable medium. In one embodiment, they may be stored on a non-volatile semiconductor memory external to the microprocessor, or integrated with the microprocessor in a SOC. In another embodiment, the instructions may be stored on a disk and read into a volatile semiconductor memory when a disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to:
      receive a plurality of access commands including a first access command out of a group G of access commands;
      store the access commands in a command queue;
      receive a completion status for a number of access commands out of the G access commands that are assigned to other disk drives;
      select the first access command from the command queue based on the completion status; and
      execute the first access command.

2. The disk drive as recited in claim 1, wherein the completion status comprises a number of access commands out of the G access commands that are pending in the other disk drives.

3. The disk drive as recited in claim 1, wherein the completion status comprises a number of access commands out of the G access commands that are completed by other disk drives.

4. The disk drive as recited in claim 1, wherein the control circuitry is further operable to:
   estimate a seek latency of the head and a rotational latency of the disk associated with executing each access command stored in the command queue; and
   select the first access command from the command queue based on the completion status, the seek latency, and the rotational latency estimated for the first access command.

5. The disk drive as recited in claim 4, wherein the control circuitry is further operable to:
   estimate an access time first_T corresponding to the seek latency and the rotational latency;
   adjust the first_T in response to the completion status; and
   select the first access command from the command queue based on the adjusted first_T.

6. The disk drive as recited in claim 5, wherein the control circuitry is further operable to adjust the first_T according to:

$$(\text{first\_}T + (TFOD(Q)*(G-F-1)))/G$$

where:
TFOD(Q) represents an average time for the other disk drives to complete a single access command at a command queue depth of Q; and
F represents a number of the access commands out of the G access commands completed by the other disk drives.

7. The disk drive as recited in claim 5, wherein the control circuitry is further operable to adjust the first_T according to:

$$(\text{first\_}T*(G-F))/G$$

where F represents a number of the access commands out of the G access commands completed by the other disk drives.

8. The disk drive as recited in claim 5, wherein the control circuitry is further operable to:
   estimate an access time second_T for a second access command stored in the command queue; and
   when the second_T is less than the adjusted first_T, select the second access command from the command queue for execution prior to selecting the first access command from the command queue.

9. The disk drive as recited in claim 1, wherein the control circuitry is further operable to:
   receive the plurality of access commands over a first interface; and
   receive the completion status over a second interface.

10. A method of operating a disk drive, the disk drive comprising a head actuated over a disk, the method comprising:
   receiving a plurality of access commands including a first access command out of a group G of access commands;
   storing the access commands in a command queue;
   receiving a completion status for a number of access commands out of the G access commands that are assigned to other disk drives;
   selecting the first access command from the command queue based on the completion status; and
   executing the first access command.

11. The method as recited in claim 10, wherein the completion status comprises a number of access commands out of the G access commands that are pending in the other disk drives.

12. The method as recited in claim 10, wherein the completion status comprises a number of access commands out of the G access commands that are completed by other disk drives.

13. The method as recited in claim 10, further comprising:
   estimating a seek latency of the head and a rotational latency of the disk associated with executing each access command stored in the command queue; and
   selecting the first access command from the command queue based on the completion status, the seek latency, and the rotational latency estimated for the first access command.

14. The method as recited in claim 13, further comprising:
   estimating an access time first_T corresponding to the seek latency and the rotational latency;
   adjusting the first_T in response to the completion status; and
   selecting the first access command from the command queue based on the adjusted first_T.

15. The method as recited in claim 14, further comprising adjusting the first_T according to:

$$(\text{first\_}T + (TFOD(Q)*(G-F-1)))/G$$

where:
   TFOD(Q) represents an average time for the other disk drives to complete a single access command at a command queue depth of Q; and
   F represents a number of the access commands out of the G access commands completed by the other disk drives.

16. The method as recited in claim 14, further comprising adjusting the first_T according to:

$$(\text{first\_}T*(G-F))/G$$

where F represents a number of the access commands out of the G access commands completed by the other disk drives.

17. The method as recited in claim 14, further comprising:
   estimating an access time second_T for a second access command stored in the command queue; and
   when the second_T is less than the adjusted first_T, selecting the second access command from the command queue for execution prior to selecting the first access command from the command queue.

18. The method as recited in claim 10, further comprising:
   receiving the plurality of access commands over a first interface; and
   receiving the completion status over a second interface.

19. A method of scheduling commands in a dependent array of disk drives, the method comprising:
   transmitting a first access command out of a group G of access commands to a first disk drive;
   transmitting a plurality of the access commands out of the group G of access commands to other disk drives; and
   transmitting a completion status to the first disk drive, wherein the completion status identifies a status of the plurality of access commands transmitted to the other disk drives.

20. The method as recited in claim 19, wherein the completion status comprises a number of access commands out of the G access commands that are pending in the other disk drives.

21. The method as recited in claim 19, wherein the completion status comprises a number of access commands out of the G access commands that are completed by other disk drives.

* * * * *